United States Patent [19]

Gragg et al.

[11] 4,258,008
[45] Mar. 24, 1981

[54] SYSTEM FOR PHOSPHORIC ACID PRODUCTION WITH DECREASED FOAMING

[75] Inventors: Fredrick M. Gragg, Riverside; John D. Ellis, Upland, both of Calif.; Allen S. Adams, Jasper, Fla.

[73] Assignees: Occidental Research Corporation; Occidental Chemical Company, both of Irvine, Calif.

[21] Appl. No.: 866,989

[22] Filed: Jan. 5, 1978

[51] Int. Cl.³ .................... B01J 19/18; C01B 25/222
[52] U.S. Cl. .................................................... 422/189
[58] Field of Search ................ 23/285, 259.2; 55/36, 55/87, 178; 423/167, 319, 320; 422/189, 198, 225, 227, 232, 234; 137/171

[56] References Cited

U.S. PATENT DOCUMENTS

| 290,491 | 12/1883 | Snell | 137/171 |
|---|---|---|---|
| 1,836,672 | 12/1931 | Larson | 423/167 |
| 2,078,627 | 4/1937 | Black et al. | 23/285 |
| 2,768,704 | 10/1956 | Cronkhite | 55/178 |
| 2,968,544 | 1/1961 | Zeitz et al. | 423/320 |
| 3,148,948 | 9/1964 | Lutz | 55/178 |
| 3,173,763 | 3/1965 | Miller et al. | 23/285 |
| 3,257,168 | 6/1966 | Chelminski | 423/167 |
| 3,418,077 | 12/1968 | Robinson | 423/167 |
| 3,453,076 | 7/1969 | Long et al. | 423/167 |
| 3,522,003 | 7/1970 | Lopker | 423/167 |
| 3,522,004 | 7/1970 | Lopker | 423/167 |
| 3,653,826 | 4/1972 | Ishihara et al. | 423/320 |
| 3,726,647 | 4/1973 | Somerville | 23/259.2 |
| 3,939,248 | 2/1976 | Caldwell | 423/167 |
| 3,952,765 | 4/1976 | Cohan | 137/171 |
| 4,053,563 | 10/1977 | Somerville | 423/320 |

OTHER PUBLICATIONS

Slack, "Phosphoric Acid," vol. 1, pp. 279-284, 369-386, Marcel Dekker, N.Y., 1968.

*Primary Examiner*—Frank W. Lutter
*Assistant Examiner*—Roger F. Phillips
*Attorney, Agent, or Firm*—Barry A. Bisson; Robert A. Franks

[57] ABSTRACT

A system for the preparation of phosphoric acid from phosphate rock and sulfuric acid, includes in combination a first reaction vessel containing a first slurry comprising calcium sulfate hemihydrate, monocalcium phosphate and phosphoric acid, a second reaction vessel containing a second slurry comprising calcium sulfate hemihydrate, circulation means including a draft tube disposed centrally in each of said vessels and an agitator positioned axially in each of said vessels within said draft tube, a first conduit interconnecting said first and second reaction vessels for conducting said first slurry from said first reaction vessel to said second reaction vessel, a second conduit interconnecting said vessels for conducting said second slurry from said second reaction vessel to said first reaction vessel, an inlet pipe for introducing phosphate rock and phosphoric acid to said first reaction vessel, said inlet pipe connected with the interior of said draft tube in said first vessel and wherein a vent is connected to said inlet pipe to permit escape of gases and, thus, increasing the rate of flow of said phosphate rock and phosphoric acid to said first reaction vessel.

10 Claims, 9 Drawing Figures

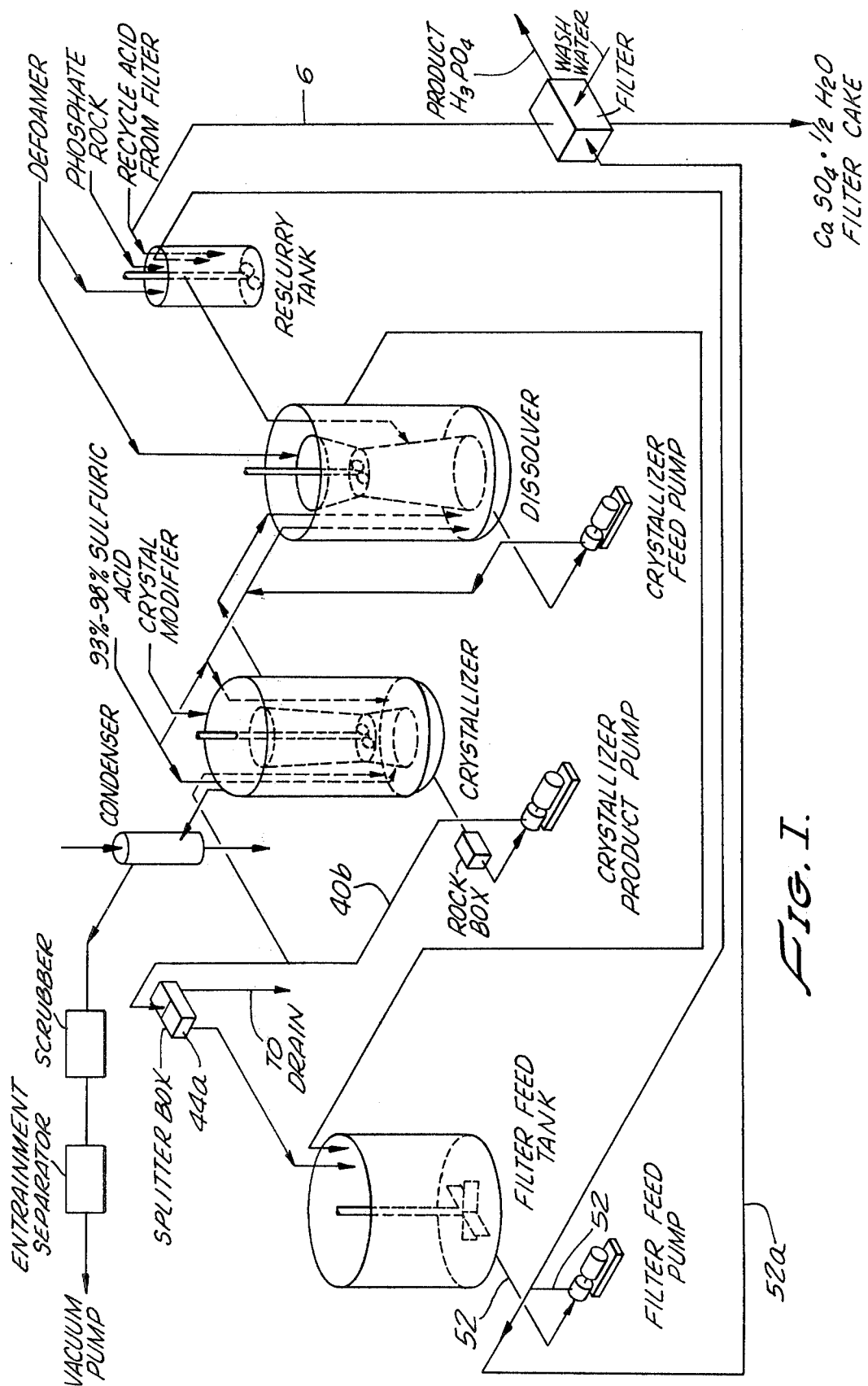
Fig. I.

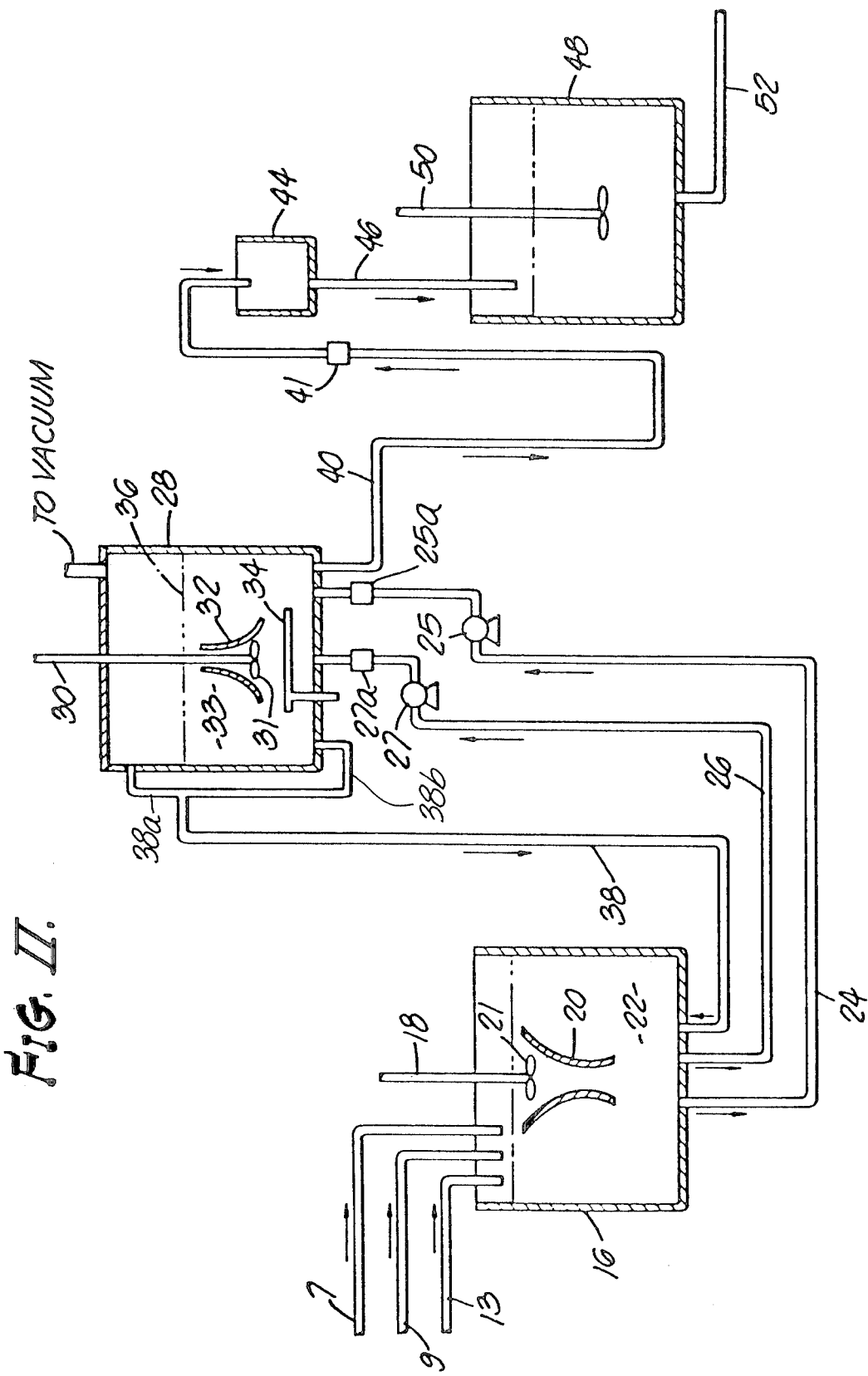

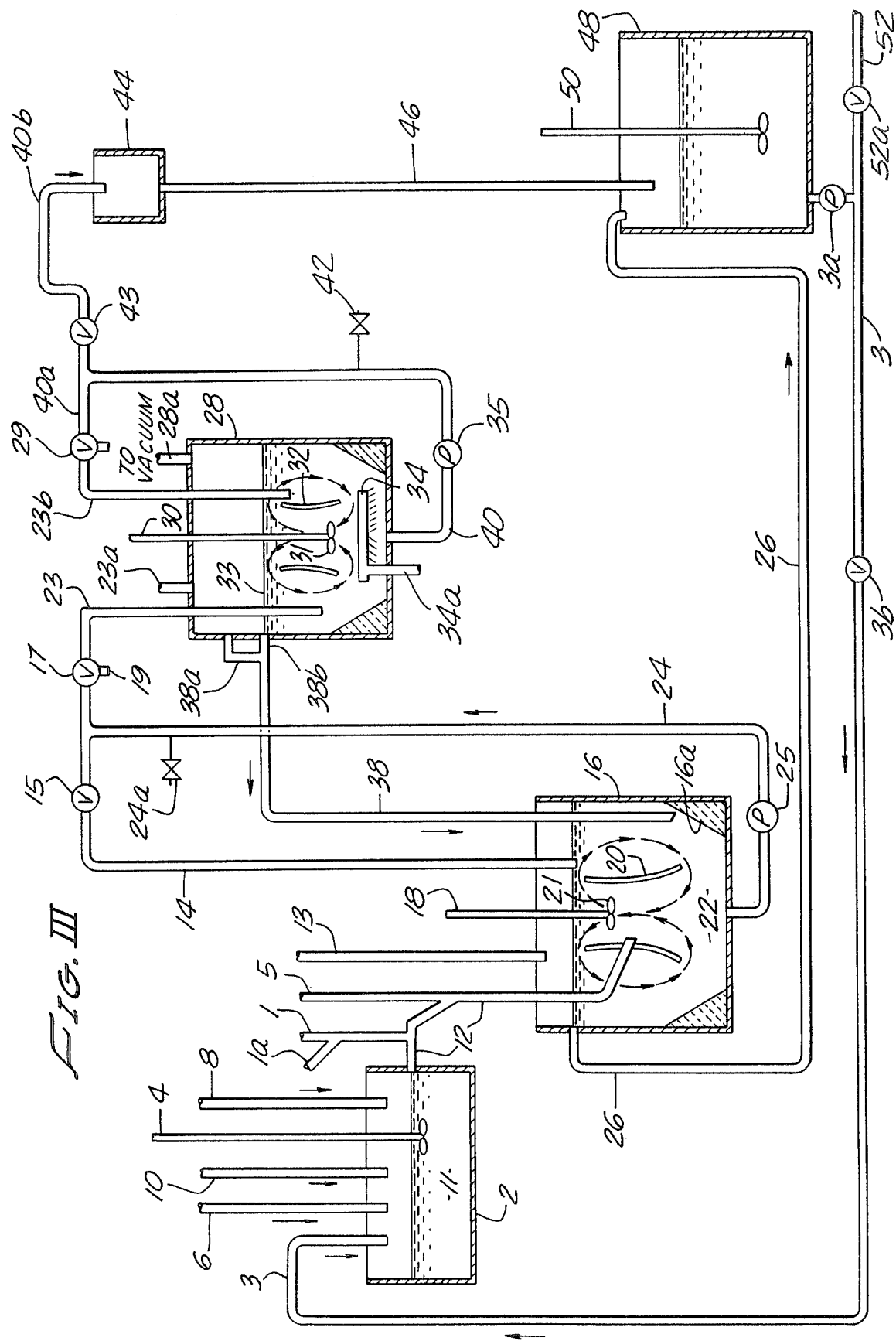
Fig. III

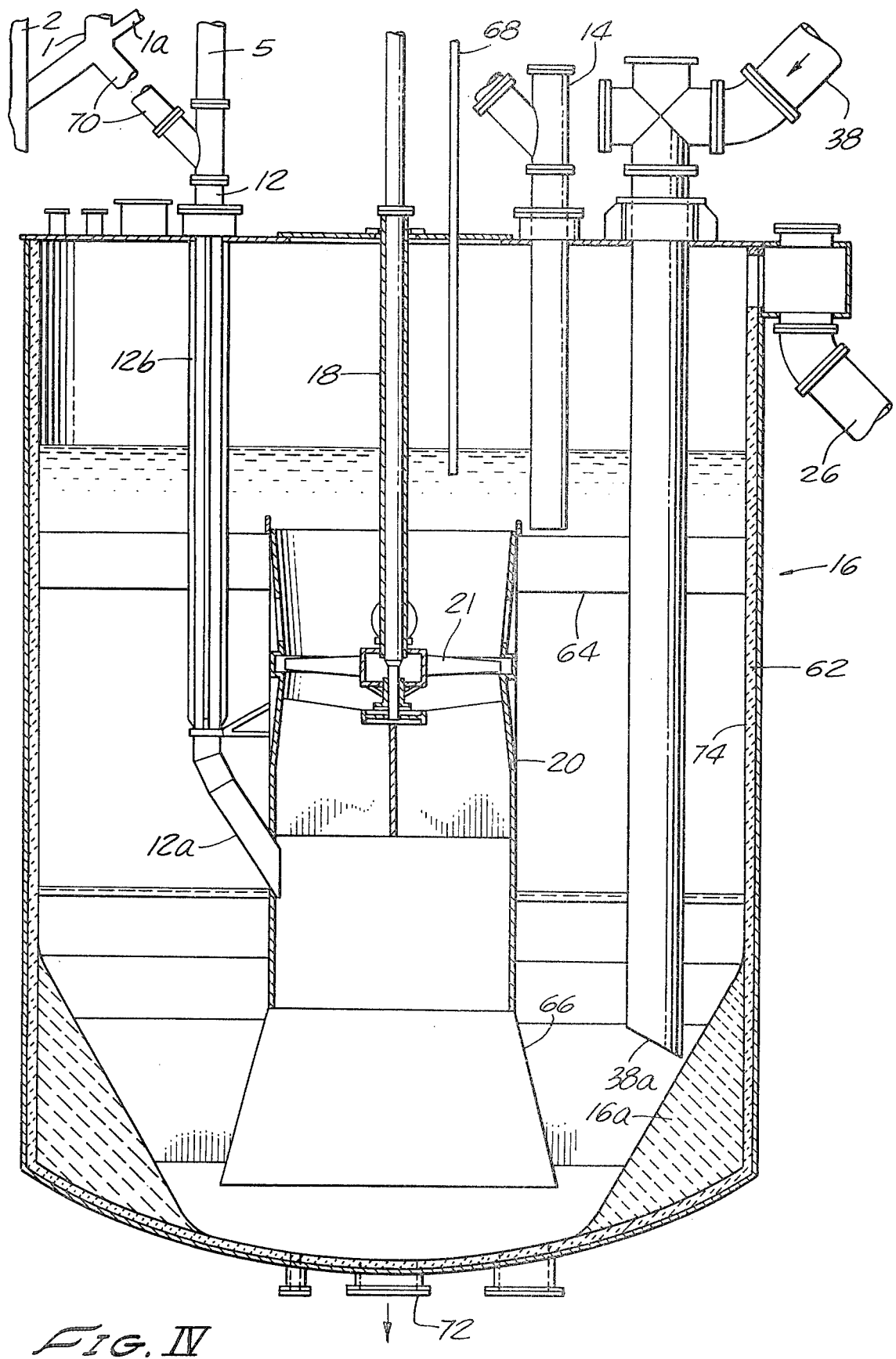
FIG. IV

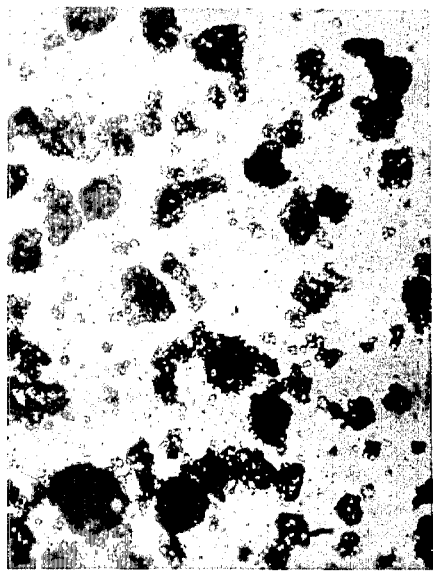
FIG. V.
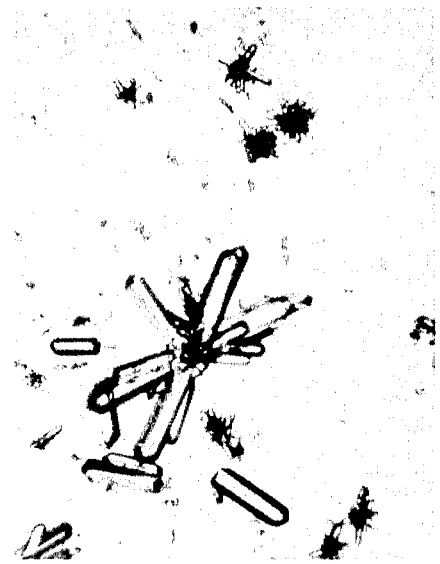
FIG. VI.
FIG. VII.
FIG. VIII.

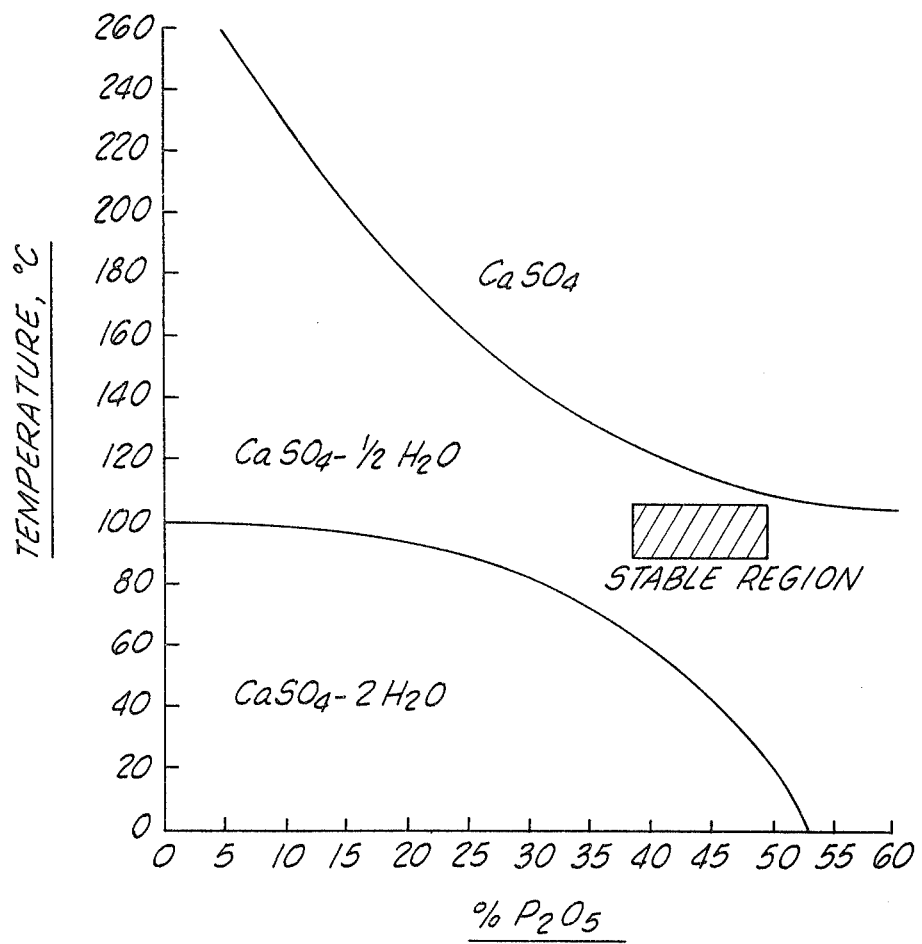
FIG. IX

SYSTEM FOR PHOSPHORIC ACID PRODUCTION WITH DECREASED FOAMING

CROSS REFERENCE TO RELATED APPLICATIONS

This application is related to applications Ser. No. 703,139 issued Feb. 20, 1979, as U.S. Pat. No. 4,140,748; Ser. No. 703,138 now abandoned; and Ser. No. 703,208, issued Jan. 2, 1979, as U.S. Pat. No. 4,132,760, all filed July 7, 1976; Ser. No. 676,559, filed Apr. 13, 1976, now abandoned; Ser. No. 810,484, filed June 27, 1977, issued Jan. 23, 1979, as U.S. Pat. No. 4,136,199; Ser. No. 840,791, filed Oct. 11, 1977; to the two applications of Ore's, Moore and Ellis filed Dec. 29, 1977, Ser. No. 865,557, issued Apr. 1, 1980, as U.S. Pat. No. 4,196,172 and Ser. No. 865,556, filed Dec. 29, 1977, now abandoned; and to our application Ser. No. 866,990, now abandoned, titled "Apparatus for Phosphoric Acid Production with Decreased Foaming"; and the two applications of Gragg and Adams, Ser. No. 866,988, and Ser. No. 866,987, now abandoned, all three filed on the same date as the subject application (all of the above-cited applications are owned by Occidental Petroleum Corporation or its wholly-owned subsidiaries and the entire disclosures of which are incorporated herein by this reference).

BACKGROUND

The present invention especially relates to the processes described in application Ser. Nos. 676,559; 703,138; 703,139; and 703,208, since it permits reaction or dissolution of phosphate rock with decreased foaming in all of these processes.

In these applications, phosphate rock and sulfuric acid are reacted under conditions which result in the formation of solid calcium sulfate (either hemihydrate or gypsum) and phosphoric acid. A two vessel reaction system is used in which the reaction slurry undergoes intra- and inter- vessel circulation. Preferably, the intra-vessel circulation is through a draft tube. This results in excellent dispersion of reactants and minimization of temperature and concentration gradients throughout the slurry. In the hemihydrate process, the solution portion of the slurry in the first vessel (the "dissolver") is preferably maintained at a negative sulfate concentration (i.e. excess dissolved $Ca^{+2}$) and the solution in the second vessel (the "crystallizer") is preferably maintained at a positive sulfate ion concentration. Also preferred is that the second vessel be maintained at a reduced pressure (e.g. to provide evaporative cooling). Better filtration rates can thus be obtained due to the favorable shape, dominant size and size distribution (especially, low fines content) of the calcium sulfate crystals. Most preferred is that a crystal modifier (e.g. a sulfonic acid, a sulfonic acid salt, tall oil, fatty acids or esterified tall oil, fatty acids) be present in the crystallizer. A two vessel hemihydrate process is described in U.S. Pat. No. 3,418,077 of Robinson, issued Dec. 24, 1968. Also relevant is the article by J. G. Getsinger, "IV Hemihydrate by the Foam Process" in Phosphoric Acid, Part 1, edited by A. V. Slack, at pages 369-382, Marcel Dekker, Inc., New York (1968), which shows a one vessel process.

U.S. Pat. No. 3,522,003 to Lopker shows $CO_2$ removal by venting but from a separate pipe from the feed inlet (see also U.S. Pat. No. 3,522,004).

The present invention is directed to the manufacture of phosphoric acid by the wet process wherein phosphate rock is dissolved or reacted in phosphoric acid to produce a solution or slurry of monocalcium phosphate. The hemihydrate, or as it is sometimes called, the semihydrate, process is employed to produce wet phosphoric acid from phosphate rock and sulfuric acid. Phosphate rock and phosphoric acid (which can contain $H_2SO_4$ and is preferably pre-mixed in a separate slurry tank) are added to a first reaction vessel or set of reactors, in parallel or series, (the "dissolver") which contains a first slurry comprising calcium sulfate hemihydrate, monocalcium phosphate, and phosphoric acid. The "soluble" or "excess" sulfate content (i.e., the excess or deficiency of sulfate ions over calcium ions) of the first slurry in the first reaction vessel can be maintained (e.g. by addition of sulfuric acid) at a concentration of about $+0.7\%$ to about $-4\%$ or even $-8\%$ (more preferred 0.0 to $-6\%$), as determined for example, by the well-known gravimetric analysis. It is more preferred to be at a negative sulfate (e.g. excess $Ca^{+2}$). The sulfuric acid in the first (dissolver) vessel is usually contained in "recycle" phosphoric acid from a filtration step and/or sulfuric acid contained in a side stream or recycle slurry from the second reaction vessel. If two dissolver vessels are in series, it is preferred that slurry from the second vessel (which has an excess of $Ca^{+2}$, therefore, no free sulfuric acid) is used as the dissolution medium in the first dissolver vessel (e.g., the first vessel would be at about $-6\%$ $SO_4$ and the second vessel at about $-4\%$, caused by addition of sulfuric acid only to the second vessel). This would greatly reduce the "lattice bound" $P_2O_5$ loss. This method of operation is the invention of James Moore, John Ellis and Gary Beer and will be the subject of a later filed application.

Sulfuric acid is added to the second reaction vessel which contains a second slurry comprising calcium sulfate hemihydrate, monocalcium phosphate, sulfuric acid and phosphoric acid. The sulfuric acid reacts with the monocalcium phosphate and any residual, undissolved phosphate rock, producing calcium sulfate hemihydrate and phosphoric acid. The soluble or excess sulfate concentration of the second slurry is maintained at a positive value (about $+0.7\%$ to about $+4.5\%$).

Sulfuric acid is added in amounts such that the sulfate content of the added acid and the sulfate content of the added rock is equivalent to about 90% to about 100% (more preferred 93-99.5%) of the stoichiometric amount of sulfate required to react with calcium added in the phosphate rock to form calcium sulfate hemihydrate.

As is well-known in the art, sulfate and/or sulfuric acid can be introduced as such or as a part of phosphoric acid "recycle" (as from the filtrate from filtering to separate the hemihydrate).

In order to maintain the desired soluble sulfate concentration in the first reaction vessel and in the second reaction vessel, circulation between the two reaction vessels is initiated. A first portion of the first slurry from the first reaction vessel is circulated through a first conduit into the second reaction vessel, and a first portion of the second slurry from the second reaction vessel is circulated through a second conduit into the first reaction vessel. This circulation is continuous. In order to better disperse the added phosphate rock and the added sulfuric acid within the slurry of the first and the second reaction vessels respectively and to better disperse the incoming slurry with the slurry present in the given reaction vessel, a second portion of the first slurry and a second portion of the second slurry is circulated within the first and second reaction vessels, respectively, preferably each through its own draft tube preferably at a rate equal to at least 50% of the volume of the slurry in a given reaction vessel per minute. This inter- and intra- vessel circulation disperses the reactants within the slurry in the respective reaction vessels. A third portion of the second slurry is removed from the reaction system so as to separate the liquid and solid components from the said slurry.

Although such patents as U.S. Pat. No. 3,939,248 to Caldwell and U.S. Pat. No. 2,968,544 to Zietz show the uses of draft tubes in phosphoric acid processes, these patents are not concerned with the problems of feed tube gas blockage or foaming or with hemihydrate processes, which are well-known to involve different deposition or scaling behavior than do gypsum processes.

Although the present process has been described as involving two reaction vessels, it should be understood that additional vessels (including reaction vessels) can be useful in the process and, for example, the dissolver can comprise two or more vessels in series or in parallel.

Especially preferred is the use of an additional vessel as a slurry tank, into which phosphoric acid (which can be a filtrate, usually containing in the range of 0.5–3.5% sulfuric acid) and phosphate rock are contacted to form a slurry which is transported (as by an overflow pipe) to the dissolver vessel. In such a slurry tank, as in the dissolver, it is frequently useful to use venting and/or to add a defoaming agent. A preferred defoaming agent comprises tall oil, tall oil fatty acids, or lower alkyl esters of tall oil fatty acids, or mixtures of such tall oil acids and esters, because such tall oil additives can also function (alone or with added sulfonics) as crystal modifiers. The preferred esters are the methyl and ethyl (as exemplified by the esters found in the commercial product marketed under the tradename AZ-10-A).

SUMMARY

The invention comprises a system for the preparation of phosphoric acid from phosphate rock and sulfuric acid, includes in combination a first reaction vessel containing a first slurry comprising calcium sulfate hemihydrate, monocalcium phosphate and phosphoric acid, a second reaction vessel containing a second slurry comprising phosphoric acid and calcium sulfate hemihydrate, circulation means including a draft tube disposed centrally in each of said vessels and an agitator positioned axially in each of said first slurry from said first reaction vessel to said second reaction vessel, a second conduit interconnecting said vessels for conducting said second slurry from said second reaction vessel to said first reaction vessel, an inlet pipe for introducing phosphate rock and phosphoric acid to said first reaction vessel, and wherein a vent is connected to said inlet pipe to permit escape of gases and, thus, increasing the rate of flow of said phosphate rock and phosphoric acid to said first reaction vessel.

The invention also includes a system for the preparation of phosphoric acid from phosphate rock and sulfuric acid, including in combination:

a. A first reaction vessel containing a first slurry comprising calcium sulfate hemihydrate, monocalcium phosphate and phosphoric acid.

b. A second reaction vessel containing a second slurry comprising calcium sulfate hemihydrate, monocalcium, phosphate, sulfuric acid and phosphoric acid.

c. Means in each of said vessels for maintaining a continuous circulation of the slurry therein from the bottom to the top of each vessel and from the top to the bottom of said vessel.

d. A first conduit interconnecting said first and second reaction vessels for conducting said first slurry from said first reaction vessel to said second reaction vessel.

e. A second conduit interconnecting said vessels for conducting said second slurry from said second reaction vessel to said first reaction vessel, f. Means for applying a vacuum to said second reaction vessel to effect temperature control in said second reaction vessel and to form a vacuum seal between said first and second reaction vessels, g. Means for introducing phosphate rock and phosphoric acid to said first reaction vessel, and including venting means to remove gases from said introducing means, h. Means for introducing sulfuric acid to said second reaction vessel, i. Means for withdrawing a slurry containing phosphoric and calcium sulfate hemihydrate from said second reaction vessel.

Preferably the system also includes a third reslurry vessel for reslurrying phosphate rock and recycle phosphoric acid, and a third conduit interconnecting said third vessel with said means for introducing phosphate rock and phosphoric acid into said first reaction vessel.

Also preferred is that said means for maintaining a continuous circulation of the slurry in each of said first and second reaction vessels includes a draft tube disposed centrally in each of said vessels and an agitator positioned axially in each of said vessels within said draft tube, whereby on actuation of said agitator the slurry in each of said vessels will flow from the bottom portion of said draft tube up through the draft tube and on exiting the top of the draft tube, the slurry will flow downwardly in the space between said draft tube and the inner wall of the vessel.

In the system, said first vessel can be a dissolver vessel for essentially dissolving phosphate rock in said first slurry, said second evacuated reaction vessel being cooled by evaporation and functioning as a crystallizer vessel for crystallizing calcium sulfate hemihydrate in said second slurry, and including a fourth, filter feed, vessel, and a fourth conduit interconnecting said means for withdrawing slurry from said second reaction vessel with said fourth vessel, for conducting said second slurry containing crystallized calcium sulfate hemihydrate and phosphoric acid to said fourth vessel, and an agitator in said fourth filter feed vessel for maintaining the slurry therein in suspension.

The fourth circuit can include a surge tank, filter means and, preferably there is a rock box in said conduit for removing any relatively large rocks in said second slurry.

The system can contain a fifth conduit for conducting slurry containing crystalline calcium sulfate hemihydrate and phosphoric acid from said fourth filter feed vessel to said filter means, for filtering crystalline calcium sulfate hemihydrate from said slurry, and a sixth conduit connecting said filter with said third reslurry vessel for conducting filtrate containing phophoric acid to said third vessel.

Preferably said second reaction vessel is positioned at an elevation higher than said first reaction vessel, said second conduit being an overflow conduit permitting return of said second slurry in said second vessel by gravity through said second conduit to said first slurry in said first vessel.

In the system, said means for introducing phosphoric acid and phosphoric acid into said first vessel can comprise an inlet pipe connected with the interior of said draft tube, and a vent connected to said inlet pipe to permit escape of gases and reduce foaming generated by the dissolving reaction in said first vessel.

The system can include a sparger in the bottom portion of said second vessel below the draft tube therein, said means for introducing sulfuric acid into said second vessel comprising an inlet, said inlet being connected to said sparger. Preferably the sparger directs the acid to the bottom of the vessel.

The system preferably includes a first recirculation conduit for selectively recirculating said first slurry from said first vessel externally thereof and back to said first vessel, a first pump in said first recirculation conduit, a second recirculation conduit for selectively recirculating said second slurry from said second vessel externally thereof and back to said second vessel, a pump in said second recirculation conduit, and valve means for discontinuing slurry flow in said first conduit from said first vessel to said second vessel during recirculation of slurry through said first recirculation conduit or said second recirculation conduit.

Another invention of John Ellis, Michael Gragg and A. Adams, which can be useful in the present process and system is an apparatus for the preparation of phophoric acid from phosphate rock and a strong acid, which comprises a closed vessel, a draft tube, means connected to the inner wall of said vessel and mounting said draft tube in a vertical position within said vessel, said draft tube having an outwardly flared lower skirt portion terminating in the bottom portion of said vessel, an agitator positioned within said draft tube, a shaft for said agitator mounted axially of said vessel and extending into said draft tube, an inlet conduit to said vessel for introducing a feed slurry of phosphate rock and strong acid into said vessel, said inlet conduit having a lower end portion terminating within said draft tube, and a vent pipe connected to said inlet conduit to reduce foaming generated by the reaction in said vessel. This apparatus is claimed in commonly owned application, Ser. No. 866,990, filed on the same day as the subject application. The entire disclosure of said application of Ellis et., al., is incorporated herein by reference.

In another apparatus, which is useful in the present invention, said inlet conduit has an elongated portion extending downwardly within said vessel, said inlet conduit having an external upper portion and an inlet portion connected to said upper portion, said feed slurry being fed into said inlet portion, and said upper portion of said inlet conduit being said vent pipe.

These features and others of the above described apparatus are illustrated in the accompanying FIG. IV.

BRIEF DESCRIPTION OF THE DRAWINGS

FIG. I is a schematic of a preferred embodiment of the process and system;

FIG. II shows a schematic of another embodiment which can be used for phosphoric acid manufacture by a gypsum type process;

FIG. III, shows a schematic of a preferred inter- and intra- vessel flow pattern;

FIG. IV, is a cross-section of a dissolver vessel illustrating the use of a vent pipe to reduce foaming and preferred relative positions of feed pipes in relation to the draft tube and agitator.

FIGS. V, VI, and VII, are respectively photomicrograph of the "raspberry", "jacks", and "needles" forms (or crystal habits) of hemihydrates. FIG. VIII is a photomicrograph of a needle type habit which is very small and difficult to filter. FIG. IX illustrates a preferred "stable region" (of temperature and % $P_2O_5$, in the calcium sulfate liquid phase) for formation of hemihydrate crystals the coordinates of the region are about 90° C., 38%; 110° C., 50%; and 90° C., 50%.

BACKGROUND AND FURTHER DESCRIPTION

The invention is especially directed to the production of phosphoric acid by the calcium sulfate hemihydrate process. In the present invention, compared to the prior art "gypsum processes", the control of reactant concentrations and filtration rates are improved, a concentrated phosphoric acid (about 35% to about 55% $P_2O_5$) is produced, sulfuric acid usage is reduced and a substantial reduction in electrical and heat energy consumption is realized.

Phosphoric acid has been prepared by the wet process for many years. The wet process involves the reaction of phosphatic solid materials, hereinafter termed phosphate rock, wherein calcium sulfate, monocalcium phosphate, phosphoric acid and sulfuric acid comprise the usual reaction media. The names of the three processes for the production of phosphoric acid by the wet process are based on the by-product calcium sulfate produced; namely, the gypsum or dihydrate process, the hemihydrate process, and the anhydrite process. In all such processes the present invention can be useful in the reaction of phosphoric acid and phosphate rock. The type of by-product is dependent upon the temperature of the system and the $P_2O_5$ concentration of the liquid phase of the slurry. Other factors such as fluorine concentration, alumina concentration, and sulfuric acid concentration play a less important role.

As is frequently illustrated by composition diagrams (plotting temperature versus acid strength), gypsum, ($CaSO_4,2H_2O$) is the by-product formed when the wet process is run at a temperature of about 90° C. or less and a $P_2O_5$ concentration of up to about 30% in the liquid portion of the slurry. Increasing the temperature to about 80° −120° C. and the $P_2O_5$ concentration to about 40% in the liquid phase will yield hemihydrate, $CaSO_4.\frac{1}{2}H_2O$. Adjusting the temperature and the concentrations, for instance, to 75° C. and 40% $P_2O_5$ results in a mixture of gypsum and hemihydrate which is very unstable. An unstable system such as this causes trouble during filtration due to the hardening or setting up of the gypsum-hemihydrate solid on the filter. Care must be exercised in maintaining the proper temperature and $P_2O_5$ concentrations in the process being run in order to avoid such problems. $CaSO_4$ anhydrite is produced at temperatures of about 130° C. and $P_2O_5$ concentrations greater than 30%. This latter process is difficult to run due to severe corrosion at the higher temperatures and the instability of the anhydrite during processing.

The stable region in FIG. IX represents a practical region for plant-scale operation of the present invention in a hemihydrate process at a good filtration rate and without encountering problems due to anhydrite or dihydrate formation. FIG. IX also shows conditions where anhydrite or dihydrate will be produced.

It should also be noted that the use of a sodium organosulfonate crystal modifier in the process system and appartus herein does not cause an adverse increase in viscosity (contrary to what one would predict from the prior art). In fact, with an organosulfonate crystal modifier, the viscosity can be decreased, as is reported by Sikdar and Ore' (one of the present applicants) in AIChE JOURNAL (Vol. 23, No. 3), pages 380–382, May, 1977.

Mixing is critical to filterability of the hemihydrate and a preferred propeller blade is of the airfoil or hydrofoil design to reduce shear and vortex formation (e.g. those marketed by Mixco). Thorough mixing is very desirable, whether running the dihydrate, the hemihydrate or the anhydrite process. Good mixing will decrease the localized high concentration of the reactants, namely, the calcium phosphate and the sulfuric aacid. Decreasing such localized concentrations, results in a lowering of the substitution losses, a lowering of losses due to coating the rock and an improvement in the crystallization conditions.

However, if the mixing involves very high shear, the desirable formation of large, "raspberry" hemihydrate may not occur. It is possible that the "raspberry" habit (as illustrated in FIG. V) may be formed by growth around the needle like projections of the "jacks" habit (illustrated in FIG. VI) and that continued high shear cause these projections to break off to form "needles" (as illustrated in FIG. VII). It is also possible that improper mixing is a cause for the formation of small fine crystals which are very difficult and filter (see FIG. VIII).

Thus, it is observed that a change of one variable may favorably affect the recovery of $P_2O_5$ from phosphate rock employing one of the wet process methods and it may be detrimental to the recovery of $P_2O_5$ employing a different process. Therefore it is necessary to choose the combination of process variables which will result in the best recovery of $P_2O_5$ from the phosphate rock along with acceptable filter-ability of the resulting slurry for the process at hand.

The recovery of the phosphate values from the phosphate rock can be greatly increased if the agitation or mixing is maintained at a high level. Previous workers in the field have directed their energy to achieve maximum mixing in the wet process. As a result of this activity, today there are one vessel and multi-vessel systems in use for the production of phosphoric acid by wet process. The purpose is to achieve maximum mixing so as to increase the recovery of the phosphate values from the phosphate rock and to have the best environment for dissolution of the rock and for crystallization of $CaSO_4$.

In a one vessel process, the phosphate rock and the sulfuric acid are added to the slurry in one tank. Agitators, in union with baffles, are used to circulate the slurry into which the reactants (phosphate rock and sulfuric acid) are added. To the extent that the localized concentration differences are minimized, the slurry has only one sulfate level. This is undesirable, since the phosphate rock should preferably be dissolved at a low sulfate concentration (preferably negative) whereas crystallization should occur at a high sulfate concentration.

A multi-vessel system can be of two types. Two or more compartments or cells can be constructed within one vessel, the compartments being interconnected in series. The reactants are added separately, that is, in different compartments in order to increase the dispersion of said reactant in the slurry prior to reacting with the other reactant. At the last compartment, some slurry is removed from the system for recovery of phosphoric acid; the major portion of the slurry being recycled to the first compartment.

Multi-vessel processes involve the use of two or more vessels connected in series, the reactants are added to the slurry in separate vessels so as to more completely disperse one reactant in the slurry before it is contacted by the later added reactant(s). Again the system is arranged so that a portion of the slurry is recycled from a later reactor back to the first reactor.

The reaction between sulfuric acid and phosphate rock is exothermic. In order to control the temperature of the reaction system, provisions must be made to remove this excess heat. Previously this has been accomplished by (1) blowing air through the slurry or (2) pumping a portion of the slurry to a vessel under vacuum or (3) conducting the operation in a vessel under vacuum.

The use of air as a coolant is not too desirable because it is necessary to scrub large amounts of air exiting the system to remove pollutants, mainly fluorine in the form of hydrogen fluoride or silicon tetrafluoride. The equipment required is quite expensive.

When a portion of the hot slurry is removed from the main body of the slurry, and subjected to vacuum, cooling occurs by the evaporation of water (U.S. Pat. No. 2,699,985). The cooled slurry is then added to the main body of the hot slurry and moderates the temperature of the process.

The method of conducting the reaction under vacuum has many desirable features. The cooled slurry is immediately dispersed within the hot slurry and temperature differentials within the slurry are minimized. The slurry is concentrated by the removal of water, and the desired temperature is easily maintained.

The above described multi-compartment and multi-vessel systems improved on dispersing the reactants to some extent, however, greater dispersion of the reactants is desirable in order to improve the dispersion of the reactants in a one vessel reactor. Caldwell, U.S. Pat. Nos 3,416,889 and 3,939,248 and Bergstrom, U.S. Pat. Nos. 3,666,143 and 3,917,457 developed a combination reactor-cooler which is fitted with a draft tube. The vessel was maintained under a vacuum while the slurry was circulated within a vessel. Using the draft tube with an agitator it is possible to circulate the slurry at such a flow rate that upwards of 200% of the volume of the slurry is circulated through the draft tube per minute, constantly renewing the surface of the slurry exposed to the vacuum. With this type of circulation, dispersion of the reactants is improved over the conventional one vessel system. In addition to better dispersion of the reactants, the slurry on exposure of the vacuum at the surface is cooled by evaporation of water. The temperature differential within the system is minimized by the rapid flow rate realized. The cooled slurry is immediatley mixed with the hot slurry minimizing the localized cooling affect.

Lopker, U.S. Pat. Nos. 3,522,003 and 3,522,004 describes the use in a gypsum process of a two vessel system for the production of phosphoric acid from phosphate rock and sulfuric acid. A vacuum is applied to one vessel and cools the slurry by evaporation of water. The cooled slurry is then rapidly dispersed within the system minimizing cooling effects and preventing supersaturation of the calcium sulfate due to reduced temperatures. The levels of the slurries within the two vessels are vertically offset.

Sulfuric acid, phosphoric acid, phosphate rock or a mixture of phosphoric acid-phosphate rock can be added to the slurry in different vesels. The reactants are mixed in the vessel and are circulated from one vessel to another. In this way, localized, high concentrations of the added reactants are minimized. Good recovery of $P_2O_5$ values from the rock are realized. Better filtration rates are also obtainable due to the retardation of the formation of excessive number of very small calcium sulfate crystals resulting from supersaturation.

Processes for the production of phosphoric acid by the hemihydrate process are well known in the art. A. V. Slack, in "Phosphoric Acid" Part One, Marcel Dekker, Inc., New York, 1968, describes hemihydrate process. The problems encountered are observed in filtering the hemihydrate slurry and the high degree of substitution of phosphate in the calcium sulfate lattice. Attempts to overcome the deficiency in filtration rate and poor $P_2O_5$ recoveries while maintaining the production of phosphoric acid containing about 40% $P_2O_5$, resulted in the development of a hemihydrate-dihydrate system. U.S. Pat. Nos. 3,472,619 and 3,552,918 are representative of the systems employed.

These patents describe the preparation of phosphoric acid by the hemihydrate process, recovering said phosphoric acid from the solid $CaSO_4.\frac{1}{2}H_2O$, recrystallization of $CaSO_4.\frac{1}{2}H_2O$ to $CaSO_4.2H_2O$, and the recovery of phosphoric acid liberated during the recrystallization of $CaSO_4.2H_2O$. Apparently, the best of both processes is achieved. High concentration, about 40% $P_2O_5$ acid is recovered while low losses in the filter cake are observed as the result of the recrystallization of the $CaSO_4.\frac{1}{2}H_2O$.

Fitch (U.S. Pat. No. 3,552,918) describes a process for the production of concentrated phosphoric acid and gypsum including the acidulation of phosphate rock in a first zone in which the resulting slurry contains from about 1% ($-2.45\%$ $SO_4^{--}$) to about 4.5% ($-11\%$ $SO_4^{--}$) excess calcium. The slurry produced in the first zone is then transferred to a second zone in which an excess of sulfuric acid is present such that from about 3% to about 6% excess sulfuric acid is present in the slurry. Hemihydrate initially produced is converted to gypsum.

Peet (U.S. Pat. No. 2,885,263) describes an anhydrite process and Long (U.S. Pat. No. 3,453,076), Peet (U.S. Pat. No. 2,885,264) and Robinson (U.S. Pat. No. 3,418,077) describe processes for the production of phosphoric acid by the hemihydrate process. No additional recrystallization of the $CaSO_4.\frac{1}{2}H_2O$ is required in these hemihydrate processes. In the Robinson process phosphoric acid containing from about 40% to about 55% $P_2O_5$ by weight is produced.

This process comprises in a first stage reacting in the presence of excess calcium ions, phosphate rock with at least nine parts by weight of phosphoric acid for each part of calcium added, said phosphoric acid containing at least 37% by weight $P_2O_5$ and 1% to 3% by weight dissolved sulfate, whereby the phosphate rock is converted into a slurry comprising monocalcium phosphate, phosphoric acid, and calcium sulfate, the percentage of calcium ion precipitated as calcium sulfate being 10 to 60%, preferably 20-50% by weight of total calcium fed, in a second stage reacting the slurry from the first stage with sulfuric acid whereby phosphoric acid containing at least 40% $P_2O_5$ by weight and calcium sulfate hemihydrate is formed, the sulfuric acid being used in an amount 0.5 to 2.0% by weight in excess of that required to convert the calcium content of the phosphate rock fed to the first stage into calcium sulfate. In the third stage, the phosphoric acid is seperated from the calcium sulfate and the crystals are washed. The temperature of the first and second stages are in the range from 80° to 111° C., preferably from 90°–110° C.

DETAILED DESCRIPTION

This invention is directed to a process for the production of phosphoric acid wherein phosphate rock is reacted or "dissolved" in phosphoric acid (but can be useful where nitric acid is used).

A major element of the present invention is that the stream or slurry (comprising phosphoric acid and calcium sulphate hemihydrate) which is passed through the separation section (e.g. a filter), has a beneficially low content of fines (i.e. solids with an average particle diameter less than about 5 microns) and a low viscosity, especially when an organic sulfuric acid or organic sulfuric acid salt is added as a crystal modifier at a concentration in the range of 1–1,000 ppm, more preferred 5–100 ppm, by weight based on the total weight of the slurry transferred to the separation section.

For production of phosphoric acid in a large scale commercial plant, it is essential that the stream to the filter have a high filtration rate, preferably at least 0.2 tons $P_2O_5$/day ft$^2$ (more preferred at least 0.5). Typically, the stream to the filter in the present process has a filtration rate of at least 0.6 tons $P_2O_5$/day-ft$^2$ and has about at least as fast a filtration rate as does the usual stream to the filter from a Prayon type gypsum process utilizing the same rock, water, sulfuric acid, etc. (yet at a significantly higher $P_2O_5$ concentration in the product acid, e.g. 28% for gypsum versus 42% for the hemihydrate).

The filter rate can be calculated as shown in the applications of Ore et al, filed Dec. 29, 1977.

Another very important factor is that the hemihydrate crystals in the feed to the filter in the present process has a fairly uniform particle size distribution and are in the "raspberry" crystal habit or form and have a very low fine content (as illustrated by the photomicrograph in the accompanying FIG. V).

FIG. VI is a photomicrograph of a more usual (especially where there are no impurities in the environment e.g., Fe Al, Mg, fluoride, $SiF_4^{-2}$) "jacks" type of calcium sulfate hemihydrate crystal habit (which may be a precursor of the raspberry crystal).

FIG. VII shows a "needle" form of calcium sulfate hemihydrate crystal habit. The FIG. VII crystals may possibly be formed by fission from the "jacks" type habit (e.g. by high shear agitation).

FIG. VIII is a photomicrograph of a very poor small needle type crystal habit which is very difficult to filter due to the high proportion of fines.

It should be noted that when operating the invention as described herein filtration has been very good; however, on some occasions solids have built-up and caused buckling of the filter elements, probably due to loss of sulfate control.

Phosphate rock, either calcined or uncalcined, and phosphoric acid are added to a first slurry comprising phosphate rock, calcium sulfate hemihydrate, monocalcium phosphate, phosphoric acid and sulfuric acid. Preferably, the phosphate rock is slurried in the phosphoric acid prior to the addition to the first slurry. Phosphate rock, about 95% of +100 mesh, containing at least 32% $P_2O_5$ is the preferred source of phosphate for the process. Ground or unground rock can be used. For example, phosphate rock of 95% of −200 mesh can be used. Rock containing less than 32% $P_2O_5$ is acceptable, and can be employed in this process. High alumina phosphate pebble may also be used, especially when the resulting acid is purified by the process of U.S. Application Ser. No. 676,559 filed Apr. 13, 1976 of Ore, the entire disclosure of which is hereby incorporated herein. The phosphate rock is slurried in phosphoric acid that contains from about 20% to about 40% $P_2O_5$. Phosphoric acid, recycled from the separation section, containing from about 20% to about 40% $P_2O_5$ (and usually some sulfuric acid) is usually used in the process. When the phosphoric acid is recycled from the separation section it will usually contain from about 0.5% to about 3.5% sulfuric acid by weight. Phosphoric acid from other sources, such as other phosphate plants, merchant grade acid may be used.

The temperature of the phosphate rock-phosphoric acid mixture is maintained at about 50° C. to about 100° C., preferably from about 90° C. to about 100° C. The resulting mixture is from about 30% to about 40% solids by weight, about 33% being preferred. A defoamer is added if and when required. Calcination of the rock can reduce or eliminate foaming. Various antifoam agents can be used, including tall oil, tall oil fatty acids, alkyl esters and part esters of tall oil fatty acids, sulfated tall oil fatty acids, tall oil rosin, alkoxide adducted tall oil rosin, oleic acid, sulfated oleic acid, silicones, reaction products of amines and carboxylic acids and mixtures of two or more of such defoamers.

The phosphate rock-phosphoric acid mixture is added to a first slurry of calcium sulfate hemihydrate, phosphoric acid, monocalcium phosphate and sulfuric acid in a first reaction vessel. The phosphate rock and phosphoric acid may be admixed in a separate vessel or added separately to the first slurry in the first reaction vessel. The phosphate rock-phosphoric acid mixture on being added to the first slurry in the first reaction vessel is rapidly dispersed within the first slurry. A first portion of the first slurry is transferred to a second reaction vessel.

The first reaction vessel is fitted with a draft tube and an agitator (although the draft tube can, in some cases, be removed). The agitator can consist of a shaft fitted with a propeller at the bottom thereof. The agitator is so located with respect to the draft tube that on activation of the agitator, a second portion of the first slurry is drawn from the bottom of the draft tube up through the draft tube and out the top of the draft tube. On exiting the draft tube said slurry passes in a downward direction in the space between the draft tube and the walls of the first reaction vessel. The direction of circulation through the draft may be reversed and is not critical. In this first or dissolver vessel (or set of vessels), considerable gas ($CO_2$) is generated and, like a giant milkshake, the apparent density of the contents can be about 1.0, although when the gas is removed, the actual density of the contents is about 1.6 to 2.0.

Circulation is thus established within the first reaction vessel. The rate at which said slurry is circulated is at least equal about 50% of the volume of the slurry in the first reaction vessel per minute, preferably from about 50% to about 150% and most preferably about 100%. This circulation thoroughly disperses the phosphate rock-phosphoric acid mixture within the first slurry. The recycle phophoric acid dissolves the $P_2O_5$ in the rock forming monocalcium phosphate. This is an exothermic reaction which supplies the heat required to maintain the temperature of the slurry in the first reaction vessel between about 66° C. to about 113° C. The soluble or "excess" sulfate content of the first slurry is typically maintained at about +0.0% to about −4%, (but, depending on the method of sulfate analysis, the soluble sufate can be as low as −7%, below which the rock dissolution practically stops due to saturation of calcium phosphate). The first slurry, whether in one or a plurality of reactors is maintained at an excess of $Ca^{+2}$ (a deficiency of $SO_4^{-2}$) for stoichiometric formation of $CaSO_4$.

The temperature and $P_2O_5$ content in the dissolver vessel and especially in the crystallizer or second vessel, are preferably within the region shown on the striped rectangle labeled "stable region" in the accompanying FIG. IX, titled "Hydrates of $CaSO_4$ Precipitated VS % $P_2O_5$ and Temperature".

As measured, soluble sulfate values can be either positive or negative. Soluble sulfate values include not only the sulfuric acid present in the liquid component of the slurry but also the soluble calcium sulfate there present. Negative soluble sulfate values indicate that excess of calcium ions are present in the solution, as is usually observed in the phosphate rock-phosphoric acid mixture. Positive soluble sulfate values indicate that excess sulfate ions are present. A value of 0.0% indicates that the sulfate ions and the calcium ions are equivalent stoichiometrically within the limits of the analysis.

One typical analysis is 0.9% CaO and 2.2% $SO_4$ which would calculate $$0.9 \left| \frac{96 \text{ (M.W. } SO_4)}{56 \text{ (M.W. CaO)}} \right. = 1.54 \; SO_4 \text{ equivalent to CaO.}$$

This leaves 2.2−1.5=+0.7% "free or soluble" sulphate.

That is, a positive soluble sulphate.

Another analysis is 0.98% CaO and 1.4% $SO_4$, which calculates $$0.98 \left| \frac{96}{56} \right.$$

= 1.7 sulphate equivalents from the CaO 1.4 − 1.7 = −0.3% soluble sulphate.

That is, there is insufficient sulphate concentration to combine with all of the calcium, which is reported as a negative value.

As is described further in the applications of Ore et al, filed Dec. 29, 1977, the numerical value of negative sulfate can vary somewhat depending on the analytical procedure for sulfate ions.

For positive sulfate values, there is little or no difference between values obtained by different analytical methods. The preferred method of calcium analysis is by atomic absorption, which is highly accurate for both positive and negative sulfate.

The residence time of the solids in the first reaction vessel is from about 2.0 hours to about 5.0 hours, preferably from about 2.5 hours to about 4.5 hours.

A first portion of the first slurry is transferred through a first conduit into a second reaction vessel. The second reaction vessel, which is preferably subjected to a vacuum, is fitted with a draft tube, an agitator and a sulfuric acid inlet. The agitator consists of a shaft fitted with a propeller at the bottom thereof. The shaft and agitator are so located with respect to the draft tube that on actuation of the agitator a second portion of the second slurry is caused to flow from the bottom of the draft tube up through the draft tube and out the top of the draft tube. On exiting the draft tube, said second portion of the second slurry flows in a downward direction in a space between the draft tube and the inside walls of the second reaction vessel. The direction of the circulation can be reversed and is not critical. The rate at which the slurry is circulated is at least equal to about 50% of the volume of the slurry in the vessel per minute, preferably from about 50% to about 150% of the volume and most preferably about 100% of the volume.

Sulfuric acid, preferably about 98%, is added through the sulfuric acid inlet into the second slurry either as is or mixed with phosphoric acid. The first portion of the first slurry is also added into the second slurry.

A crystal modifier, usually a derivative of tall oil or of an organic sulfonic acid, preferably a salt, can be added to the slurry in the second reaction vessel. The crystal modifier can also be added to the first reaction vessel. A preferred crystal modifier is selected from alkyl, aryl, alkylaryl, and alicyclic derivates of sulfonic and sulfuric acids in which the organic radical contains from about 12 to about 30 carbon atoms. The free acid, salts thereof and mixtures of the free acid and salts may be used. The preferred salts include those of alkali metals, ammonia and alkyl, aryl or alkylaryl amines (e.g. trimethyl amine, diethyl amine, monopropyl amine). Polymeric sulfonates and sulfates can also be employed. Examples of crystal modifiers which can be employed in the present process are alkyl sulfonic acids containing from about 12 to about 30 carbon atoms, benzenesulfonic acid, alkylbenzenesulfonic acid in which the alkyl group contains from about 8 to 20 carbon atoms, alkylcyclohexane sulfonic acid in which the alkyl group contains from about 8 to 20 carbon atoms, polymeric sulfonates and sulfates such as polystyrene sulfonate, and polyvinylsulfonate, said polymeric material having a molecular weight of from about 500 to about 1,000,000. The organic sulfonic acid can be an alkyl-,aryl-,or an alkylaryl-sulfonic acid or a sulfated derivative of a carboxylic acid or an alkalimetal, amine or ammonium salt thereof.

For example, tetradecylsulfonic acid, benzene-sulfonic acid, isooctylbenzene sulfonic acid and sulfated oleic acid may be used as crystal modifiers in this process. Mixtures of two or more modifiers are also useful. The crystal modifier is added for the purpose of increasing the growth of the hemihydrate crystals formed in the system. The preferred salts include those of sodium, potassium, ammonia and primary, secondary and tertiary alkyl amines containing from 1 to about 30 carbon atoms. Preferably, the modifier as described above, is present at a level of about 1 to 1,000 ppm (usually 5 to 500 ppm) based on the weight of slurry to the separation section. Preferably, the levels of modifier and of defoamer are kept as low as possible (while maintaining good filterability), since residual quantities in the phosphoric acid product can cause crud formation (e.g., emulsions and deposits) if the acid is later treated to remove magnesium impurities by the process of U.S. Patent application Ser. No. 688,265 filed May 20, 1976 issued Oct. 11, 1977 as U.S. Pat. No. 4,053,564 (which is incorporated herein) and the related processes in U.S. Ser. No. 840,791 filed Oct. 11, 1977.

An unexpected discovery is that salts of sulfonic acids can be used as crystal modifiers in the process of the present invention without causing an adverse increase in solution viscosity. This result is surprising, in view of the teaching in Slack, Phosphoric Acid, M. Deckker, Inc., New York, 1968 (at pate 383), "Neutral surfactants, such as a salt of ABS, have an adverse effect on slurry viscosity".

The flow of the second slurry within the second reaction vessel thoroughly disperses the first portion of the first slurry, the sulfuric acid and the crystal modifier within the second slurry. The location of the sulfuric acid inlet in the second reaction vessel is not critical. It may be at the top, the middle, the bottom or at intermediate points of the second reaction vessel. The sulfuric acid conduit attached to the sulfuric acid inlet may enter the second reaction vessel from the top, the bottom, or points intermediate therein, the exact point of entrance into the vessel is not critical.

Phosphoric acid, if needed, can be added to the second slurry within the second reaction vessel.

The surface of the second slurry in the second reaction vessel is preferably exposed to a pressure of between about 2 to about 29 inches of mercury absolute, more preferably from about 3 to about 20 inches mercury absolute. Water and volatile components added to, or produced in, both the first and second slurries can be removed from the second slurry by evaporation causing a reduction in the temperature of the second slurry. The cooled second slurry is thoroughly mixed so that temperature differentials are minimized within the total volume of the second slurry. With this evaporative cooling, the temperature of the second slurry is maintained between about 66° C. to about 113° C. preferably from 80° C. to about 105° C. Although it is greatly preferable to operate the second vessel under reduced pressure, the process can be run while maintaining both the first and second reaction vessels at atmospheric pressure. Sulfuric acid, which is added to the second slurry in the second reaction vessel through the sulfuric acid inlet, can be from about 89% to 99% $H_2SO_4$, typically about 98% $H_2SO_4$.

The total sulfate value added to the system is the sum of the sulfate values in sulfuric acid added plus the sulfate values added in the rock. Surprisingly in the present process this total can be only about 90% to 100% of the stoichiometric amount of sulfate needed to convert the calcium added in the rock fed to the first reaction vessel into calcium sulfate hemihydrate. Table 1 herein is a compilation of such sulfuric acid usage. Listed are the tons per day (TPD) of phosphate rock fed, % CaO in the rock, % $SO_4^{--}$ in the rock, CaO fed (TPD), stoichiometric sulfate for the calcium in the rock (TPD), sulfate in sulfuric acid fed to the unit (TPD), sulfate equivalent in the rock (TPD), the total sulfate used (TPD), and total sulfate used as a fraction of the stoichiometric amount of sulfate required for the calcium in the rock.

The soluble sulfate content as measured in the second slurry should be from about +0.7% to about +4.5%, preferably from about 1.5% to about 3.0%. The specific gravity of the slurry in the second reaction vessel is about 1.80%±.2 g/cc. The specific gravity of the liquid portion of the slurry is about 1.56±0.20 g/cc. The liquid gravity corresponds to a phosphoric acid which contains about 44%±10% $P_2O_5$. Residence time of the solids in the second reaction vessel is from about 0.6 hour to about 2.0 hours, preferably from about 0.7 hour to about 1.6 hours.

The excellent mixing obtained with this system is achieved using approximately 1/16 of the horsepower required for a comparable wet process gypsum type phosphoric acid plant such as a Dorr-Oliver or a Prayon Plant.

A first portion of the second slurry flows from the second reaction vessel back to the first reaction vessel through a second conduit and is thoroughly dispersed within the first slurry.

It is the flow of the second slurry to the first slurry which aids in controlling the temperature of the first slurry and adds sulfate values (sulfuric acid) and phosphoric acid values to the first slurry in order to dissolve the rock. Additional sulfate values are usually added to the first slurry in the first reaction vessel with the recycled phosphoric acid. Circulation between vessels and within vessel minimizes localized concentration of reactants of hot slurry and of cooled slurry thus resulting in a more easily controlled process than previously observed.

A third portion of the second slurry is removed from the second reaction vessel and is transferred through a conduit to a reservoir. The third portion of the second slurry, on a weight basis, is approximately equal to the phosphate rock, the phosphoric acid, and the sulfuric acid added in the first and second reaction vessels respectively minus the volatiles (on a weight basis) removed from the second reaction vessel which can be subject to a vacuum.

For plant control purposes, the flow rates of the reactants and of the slurries can be adjusted in accordance with the analytical values obtained in order to maintain the desired sulfate levels within the reaction system. It is to be understood that the system described can be run on a batch or continuous basis (wherein the reactants can be continuously added and the third portion of the second slurry can be continuously removed from the system prior to separation into phosphoric acid and calcium sulfate hemihydrate).

A defoamer is added if and when required. The defoamer may be selected from the group consisting of tall oil rosin, alkoxylated tall oil rosin (see U.S. Pat. No. 3,594,123, issued July 20, 1971 to Encka et al), tall oil fatty acids, whole or part esters of tall oil fatty acids, sulfated tall oil fatty acids, alkoxylated tall oil fatty acids, oleic acid, sulfated oleic acid, silicones and mixtures of a monocarboxylic acid (12–22 carbon atoms) and monoalkanoylamide derivatives of the monocarboxylic acid. The preferred defoamer is a mixture of methyl esters of tall oil fatty acid and tall oil fatty acids sold by AZ Products Co. of Eaton Park, Fla. under the tradename "AZ 10A" (because AZ 10A also acts as a crystal modifier). The crystal modification is not due entirely to the presence in AZ 10A of a sodium alkyl sulfonate because crystal modification also occurs when the sulfonate is removed. The amount of the defoamer used is preferably from about 0.01% to about 0.3% (typically 0.04 to 0.1) by weight based on the weight of the slurry transferred to the separation section (or about 0.05% to 1.5% based on $P_2O_5$ produced by the process). As noted hereinafter, venting of the reslurry and/or dissolver vessels can reduce defoamer usage.

AZ 10A is further discussed in the applications of Ore et al, filed Dec. 29, 1977.

One of the preferred crystal modifiers, especially when AZ 10A is also present, is Actrasol W-40. Actrasol W-40 is a mixture of predominantly saturated sodium alkyl sulfonates. The alkyl groups are in the 12 carbon ranges, although there is a distribution from about 9–15 carbons. There are approximately 16 different sulfonates in the mixture; undoubtedly many are isomers and homologs of each other. It appears that Actrasol W-40 is made by the sulfonation of propylene tetramer, butylene trimer, or other material consisting of a mixture of isomers and homologs. Actrasol W-40 is further described in the application of Ore et al filed Dec. 29, 1977.

The $P_2O_5$ yield of the process can be improved by converting the hemihydrate filter cake to dihydrate cake by repulping it in water and sulfuric acid. The dihydrate slurry is filtered to separate the aqueous phase (phosphoric acid 30–35% $P_2O_5$) which is recycled to rock digestion.

There are three analytical procedures which can be used to determine sulfate in phosphoric acid; namely, gravimetric, titration and turbidity. These are all further described in the applications of Ore et al filed Dec. 29, 1977.

With some solutions, where negative sulfate ion is concerned, the titration method can give higher values than the turbidity method (e.g., −1.0% sulfate by titration and −2% by turbidity) or −3.3% by titration versus −6% by turbidity). However, both methods are usually in close agreement where positive sulfate is determined.

In the present invention the most important factor in the preferred operation is that by about every analytical method, a negative sulfate be maintained in the first (dissolver) vessel. Even a slight positive sulfate (e.g. +0.7%) in the dissolver can cause decreases in yield of phosphoric acid produced by the process (one cause being due to greatly increased nucleation, another at about 1.5% $SO_4$ to coating of the phosphate rock which decreases the amount dissolved).

Mesh size of the rock also influences yield, the smaller the particle size, the better the yield. Especially good results are obtained by wet screening rock to −28 mesh or smaller. No drying is needed.

If the second (crystallizer) reactor is not subjected to reduced pressure to provide cooling, external cooling means (such as a flash cooler) can be provided to cool the slurry.

DETAILED DESCRIPTION OF THE DRAWINGS

FIGS. I, II, and III are schematic diagrams of embodiments of the process. In FIG. III, Phosphoric acid at about 70° C., which is added through conduit 6, and phosphate rock, which is added through conduit 8, are slurried in vessel 2 which is fitted with an agitator 4. Defoamer can be added as needed through conduit 10. In a preferred embodiment, conduit 10 is of a much greater height and/or diameter than is required solely for introduction of the defoamer and, thus, can function as a vent. Properly chosen venting can greatly reduce foaming and, in many cases, can eliminate the need for a defoamer in the "reslurry" vessel 2. The temperature of slurry 11 so formed is about 92° C. and the solids content is about 30% to about 40% by weight. Slurry 11 is transferred through conduit 12 to vessel 16. Vessel 16 is fitted with an agitator (shaft 18 and propeller 21 attacted to the bottom thereof), and a draft tube 20 which is secured to the inside wall of vessel 16 by braces (not shown). Slurry 11 flows into slurry 22 which is composed of calcium sulfate hemihydrate, monocalcium phosphate, phosphoric acid, and sulfuric acid. The propeller 21 of the agitator is so positioned with respect to the location of the draft tube 20 that on actuation of the shaft 18 and propeller 21 by a motor (not shown), slurry 22 in vessel 16 will flow from the bottom portion of the draft tube 20 up through the draft tube. On exiting the top of the draft tube, slurry 22 will flow downwardly in the space between the draft tube 20 and the inside walls of vessel 16. Alternatively, the propeller blade can be positioned closer to the bottom of the draft tube and, if desired, the flow can be reversed (i.e., to flow upwardly in the space between the draft tube and the inside walls). A first portion of slurry 33 is transferred from vessel 28 through conduit 38 to vessel 16. The flow created within vessel 16 thoroughly mixes slurry 11 and slurry 33 within slurry 22. Slurry 22 is then transferred to vessel 28 through conduits 24 using pump 25. Vessel 28 may be vertically offset from vessel 16 or it may be on the same level as vessel 16. Samples for analysis of the first slurry are removed from sample port 24a. Slurry 22 is at a temperature of about 66° C. to about 113° C., and has a soluble sulfate value of about +0.7 to about −4% (most preferred below 0.0).

On entering vessel 28 which is equipped with an agitator (shaft 30 and propeller 31 attached to the bottom thereof), a draft tube 32 and a sulfuric acid inlet 34, slurry 22 is dispersed into slurry 33. Draft tube 32 is secured to the inside wall of vessel 28 by braces (not shown). Sulfuric acid is added from the sulfuric acid inlet 34 and is also thoroughly dispersed into slurry 33. Crystal modifier may be added to vessel 28 through an inlet 23a. Activation of the agitator (shaft 30 and propeller 31) by means of a motor (not shown) causes a flow of slurry 33 from the bottom of the draft tube 32 up through the draft tube and out the top portion of said draft tube. On exiting the top of the draft tube 32, the slurry flows downwardly in the space between the draft tube 32 and the inside walls of vessel 28. A circulation established within vessel 28 disperses slurry 22 and sulfuric acid into slurry 33, constantly renewing surface 36. Vessel 28 is maintained at a pressure of about 2 inches of mercury to about 29 inches of mercury absolute. Water is evaporated from the hot slurry, thus cooling the slurry. In addition to water, other volatile materials produced by the reaction of sulfuric acid and phosphate rock are also removed. These materials include $CO_2$, HF, $SiF_4$, $H_2S$, $SO_2$ and others. Because of the internal circulation of the slurry within vessel 28, temperature gradients are minimized. Slurry 33 (maintained at a temperature of about 66° C. to about 113° C., preferably from about 80° C. to about 105° C., and having a positive sulfate content, preferably about +0.7 to about +4.5%) is recirculated back to vessel 16 through conduit 38. Slurry 33 is efficiently dispersed within slurry 22 in vessel 16 by means of the internal circulation within vessel 16. Thus, a system has been developed in which both inter and intra-vessel circulation occur so as to better disperse the reactants being added to the slurries and to reduce temperature gradients within the vessels due to heating and cooling. This circulation system permits rapid and easy plant control and the negative sulfate level in the dissolver acts like a buffer to adsorb inadvertent sulfate concentration increases in the crystallizer.

A portion of slurry 33 about equal to the amount of reactants added (phosphoric acid, phosphate rock and sulfuric acid), minus the amount of water and volatiles removed from the system is removed from vessel 28 through conduit 40. Samples for analysis of the second slurry are removed from sample port 42 located on conduit 40. The slurry is pumped (pump 35) to the diversion or splitter box 44 from which it flows to vessel 48 through conduit 46. Agitator 50 maintains the slurry in a dispersed condition in vessel 48. The slurry is pumped (pump 3a) from vessel 48 through conduit 52 to the separation section (not shown in FIG. III but shown in FIG. I). In start-up, valve 52a can be used to direct the slurry through line 3 to vessel 2, and, thus, bypass the filter and provide a fast means of building up the solid level in the slurry without dumping wet pans.

Reactants are continuously added to vessel 16 and 28, while water and volatiles and the product slurry are constantly being withdrawn from vessel 28. In case of a separation apparatus breakdown, the system can be placed on recycle. No reactants are added to the system. Intra-vessel circulation would continue and inter vessel circulation would be discontinued. As is discussed further hereinafter, the circulation system in FIG. III is especially useful in providing an economical and easy to control start-up or restart (after a short interruption) procedure.

It is to be recognized that the elevation of vessels 2, 16, 28, 44 and 48 with respect to each other is a preferred arrangement but may be varied. Likewise, the conduits connecting vessels 2, 16, 44 and 48 may be rearranged, additional conduits added and/or existing conduits deleted. For example, slurry 22 passing from vessel 16 to vessel 28 may be introduced into the top part of vessel 28 rather than the bottom part.

Another embodiment of the claimed invention is shown in FIG. II. Instead of adding the reactants phosphoric acid, phosphate rock and if necessary, the defoamer to a preslurry vessel 2 as shown in FIGS. I and III, the reactants are added directly to the first slurry 22 in vessel 16. The phosphoric acid is added through conduit 7 and the phosphate rock is added through conduit 9. The reactants are added in amounts such that the direct combination of the two results in a slurry containing between about 30% to about 40% solids by weight and an initial concentration of about 13% to about 47% $P_2O_5$ in the liquid portion of the slurry. Defoamer is added through conduit 13, if, and when needed. Once the reactants are dispersed in the first slurry 22, the parameters such as temperatures, pressures, concentrations, and flows are the same as described above for the more preferred embodiment.

FIG. II illustrates a less-preferred method of operation useing two feed lines 24 and 26 from the dissolver vessel 16 to the crystallizer 28. One line is at least double the diameter of the other. In the hemihydrate process described herein, the larger of these lines (and the associated pump) need not be used. However, the larger (or both lines) can be used if the system is operated as a gypsum process (as disclosed in Ser. No. 703,138). Such double lines can also be incorporated in the systems of FIGS. I and III if these systems are to be used in a gypsum process. This convertibility from hemihydrate to gypsum is an advantage of the reaction systems described herein.

FIG. III also illustrates a system and apparatus for phosphoric acid production by calcium sulfate hemihydrate formation. This system for the preparation of phosphoric acid from phosphate rock and sulfuric acid includes in combination a first reaction vessel (the dissolver, 16) containing a first slurry (22) comprising calcium sulfate hemihydrate, monocalcium phosphate and phosphoric acid, a second reaction vessel (the crystallizer, 28) containing a second slurry (33) comprising calcium sulfate hemihydrate, monocalcium phosphate, sulfuric acid and phosphoric acid, means in each of said vessels for maintaining a continuous circulation of the slurry therein, said last mentioned means including a draft tube (20 in the dissolver, 32 in the crystallizer) disposed centrally in each of said vessels and an agitator (18, 30) positioned axially in each of said vessels within said draft tube, whereby on actuation of said agitator the slurry in each of said vessels will flow from the bottom portion of said draft tube up through the draft tube and on exiting the top of the draft tube, the slurry will flow downwardly in the space between said draft tube and the inner wall of the vessel, a first conduit (24) interconnecting said first and second reaction vessels for conducting said first slurry from said first reaction vessel to said second reaction vessel, a second conduit (e.g. an overflow 38) interconnecting said vessels for conducting said second slurry from said second reaction vessel to said first reaction vessel, means for applying a vacuum (as indicated at 28a) to said second reaction vessel to effect temperature control in said second reaction vessel and to thereby form a vacuum seal between said first and second reaction vessels, an inlet pipe (12) for introducing phosphate rock and phosphoric acid to said first reaction vessel, said inlet pipe connected with the interior of the draft tube in said first vessel, means for introducing sulfuric acid to said second reaction vessel (e.g. a sparger 34) and means (40) for withdrawing a slurry containing phosphoric acid and calcium sulfate hemihydrate from said second reaction vessel.

The system can include a third reslurry vessel (2) for reslurrying phosphate rock and recycle phosphoric acid, and a third conduit (12) interconnecting said third vessel with said inlet pipe to said first reaction vessel. In the system, the first vessel can be a dissolver vessel for essentially dissolving phosphate rock in said first slurry, said second evacuated reaction vessel being cooled by evaporation and functioning as a crystallizer vessel for crystallizing calcium sulfate hemihydrate in said second slurry, and including a fourth filter feed vessel (48), and a fourth conduit (40b and 46) interconnecting said last mentioned means (40) for withdrawing slurry from said second reaction vessel with said fourth vessel, for conducting said second slurry containing crystallized calcium sulfate hemihydrate and phosphoric acid to said fourth vessel, and an agitator (50) in said fourth filter feed vessel for maintaining the slurry therein in suspension. The system can include a surge tank (44) or a splitter box (44a in FIG. 1) in said fourth conduit which provides a sufficient liquid head to provide a vacuum seal and (with the splitter box) a break in the line to prevent siphoning.

A splitter box is a compartmented vessel, usually containing a wire-like partition (which can be fixed or movable) and is usually used like a valve in a conduit system for a slurry (that is, it usually is used to divert flow).

The system can include filter means (the filter in FIG. 1), a fifth conduit (52) for conducting slurry containing crystalline calcium sulfate hemihydrate and phosphoric acid from said fourth filter feed vessel to said filter means, for filtering crystalline calcium sulfate hemihydrate from said slurry, and a sixth conduit (6) connecting said filter means with said third reslurry vessel for conducting filtrate containing phosphoric acid to said third vessel. The system can include a rock box (see FIG. 1) in said fourth conduit for trapping any relatively large rocks, stones and objects (especially solids formed on the sulfuric acid sparger) in said second slurry. The rock box also includes washing means (e.g., a water line, not shown) and discharge means (e.g., a drain, not shown) for removing entrapped particles during a shut down period or they can be shoveled out. In the system, the first dissolver vessel (16) can be positioned at an elevation higher than said fourth filter feed vessel (48) and include an overflow pipe (26) from said first vessel to said fourth vessel for conducting overflow slurry from said first vessel by gravity to said fourth vessel.

In the system, the second reaction vessel (28) can be positioned at an elevation higher than said first reaction vessel, said second conduit (38) being an overflow conduit permitting return of said second slurry in said second vessel by gravity through said second conduit to said first slurry in said first vessel. In the system as defined in claim 1, including a vent (5) connected to said inlet pipe (12) to permit escape of gases and reduce foaming generated by the dissolving reaction in said first vessel. The system can include a sparger (34) in the bottom portion of said second vessel below the draft tube therein, said means for introducing sulfuric acid into said second vessel comprising an inlet (34a), said inlet being connected to said sparger. The system can include a first recirculation conduit (24, 14) for selectively recirculating said first slurry from said first vessel externally thereof and back to said first vessel, a first pump (25) in said first recirculation conduit, a second recirculation conduit (40, 40a, 23b) for selectively recirculating said second slurry from said second vessel externally thereof and back to said second vessel, a second pump (35) in said second recirculation conduit, and valve means (15,17) for discontinuing slurry flow in said first conduit from said first vessel to said second vessel and to permit recirculation of slurry through said first recirculation conduit or valve means (29,43) to permit recirculation of slurry through said second recirculation conduit.

FIG. IV shows a preferred apparatus (16) for the preparation of phosphoric acid from phosphate rock and a strong acid, which comprises a closed vessel 62, a draft tube 20, means (braces 64) connected to the inner walls of said vessel and mounting said draft tube in a vertical position within said vessel, an agitator 21 positioned within said draft tube, a shaft 18 for said agitator mounted axially of said vessel and extending into said draft tube, an inlet conduit 12 to said vessel for introducing a feed slurry of phosphate rock and strong acid into said vessel, said inlet conduit having a lower end portion 12a terminating within said draft tube 20.

The inlet conduit can have an elongated portion 12b extending downwardly within said vessel, and having an external upper vent portion 21 and an inlet portion 70 connected to said upper portion, said feed slurry being fed into said inlet portion.

In the apparatus, the draft tube can have an outwardly flared lower skirt portion 66 terminating in the bottom portion of said vessel, and can include a vent pipe 5 connected to said inlet conduit to reduce foaming generated by the reaction in said vessel. The inlet conduit can have an essentially vertical portion 12b positioned within said vessel, and have an external vertical upper portion 5 extending above said vessel and an inlet portion 70 externally of said vessel and connected at an angle to said vertical external upper portion of said inlet conduit, said feed slurry being fed into said inlet portion 70, and said interconnected vertical upper portion 1 of said inlet conduit being said vent pipe.

In the apparatus, the agitator 21 can be positioned in the upper portion of said draft tube 20 (as in FIG. IV), or at the lower portion, or at an intermediate level. The lower end portion 12a of the inlet conduit 12 can terminate in the draft tube 20 below the agitator 21. The vessel 16 can have an outlet 72 in the lower end thereof below said draft tube 20.

The inner wall 74 of said vessel adjacent to the bottom thereof can be downwardly dished at 16a adjacent the lower end of said draft tube. The apparatus can include an overflow pipe 26 extending from the upper end portion of said vessel 62, and a recycle slurry pipe 38 extending into said vessel 62 and terminating 38a at a zone in the annulus thereof between the outer wall 20 of said draft tube and the inner wall 74 of said vessel, adjacent the lower skirt portion 66 of said draft tube.

The apparatus can include means 1a for introducing a treating or defoaming agent into said vent pipe 1. In the apparatus, the draft tube 20 can have an outwardly flared lower skirt portion 66 terminating in the bottom portion of said vessel 62, said vessel having an outlet 72 in the lower end thereof below said draft tube, the inner wall 74 of said vessel adjacent the bottom thereof being downwardly dished (at 16a) adjacent the lower end 66 of said draft tube 20. The apparatus can include an overflow pipe 26 extending from the upper end portion of said vessel 62, a recycle slurry pipe 38 extending into said vessel and terminating at a zone in the annulus thereof between the outer wall of said draft tube and the inner wall 74 of said vessel, adjacent the lower end portion of said draft tube, and an additional inlet pipe 68 in said vessel for the introduction of steam or a treating or defoaming agent.

ILLUSTRATIVE EXAMPLES

EXAMPLE 1

Vessels 16 and 28 and the accompanying connective means such as conduits, pumps, etc. of FIG. III are filled with a slurry consisting of calcium sulfate hemihydrate, monocalcium phosphate, phosphoric acid and sulfuric acid. The weight percent of the solids in the slurry is about 31%, the specific gravity of the degassed slurry in vessel 28 is about 1.80 g/cc. $P_2O_5$ concentration of the liquid portion of the slurry is about 42% by weight. The temperature of the slurry in vessel 16 is between about 88°–102° C. preferably between 92° C. and 105° C., whereas the temperature in vessel 28 is between 88° and 105° C., preferably 92° C. and 105° C. Soluble sulfate concentration in vessel 16 is from about +0.6 to about −7% (preferably 0.0 to −6) and the soluble sulfate concentration in vessel 28 is above 0.0 (preferably from about 0.7% to about +4.5%).

A mixture of phosphate rock (typical analysis shown in Table 2 and a size distribution shown in Table 3), and phosphoric acid is prepared by adding phosphate rock to phosphoric acid in the ratio of about 1,647 pounds of phosphate rock (about 31.2 $P_2O_5$ and 45.6 CaO) to about 3,700 pounds of phosphoric acid (about 32% $P_2O_5$). The temperature of the mixture is about 90° C. A tall oil-sulfonic acid defoaming agent (AZ 10A) is added as needed to reduce the foam caused by partial dissolution of the phosphate rock in phosphoric acid.

This phosphate rock-phosphoric acid mixture is added to the first slurry in vessel 16 at the rate of about 380 gpm (about 5,350 pounds per minute). The incoming mixture is thoroughly mixed with the first slurry and a first portion of the second slurry from the second reaction vessel. Intra vessel mixing is accomplished by means of the draft tube and the agitator. The first slurry is pumped from the first reaction vessel 16 to the second reaction vessel 28 at the rate of about 1,640 gallon per minute. The first slurry is thoroughly mixed with the second slurry and 98% sulfuric acid which is added to the second reaction vessel at about 87 gpm. An organic sulfonic acid derivative can be added to the second reaction vessel 28. This material is added to promote the growth of the hemihydrate crystals. The first slurry, the sulfuric acid and the crystal modifier are thoroughly dispersed into the second slurry in the second reaction vessel 28. The second slurry flows at the rate of about 1,280 gallons per minute from vessel 28 into vessel 16 where it is thoroughly mixed with the first slurry.

About 45 gpm of water and volatile materials (HF, $SiF_4$, $H_2S$, $CO_2$ etc.) is vaporized from the second slurry in vessel 28. Vessel 28 is maintained at about 15 inches of mercury absolute. Approximately 400 gpm of slurry is withdrawn from the second reaction vessel and flows to vessel 48, the separator feed tank. Thus about 445 gpm of material (vaporized material and the slurry to the separator feed tank) is removed from the system. The removed slurry is then passed to the separation section where the solid and liquid portions of the slurry are separated.

At these rates, the plant will produce about 350 tons per day of $P_2O_5$ of 35-44% $P_2O_5$ phosphoric acid. The recovery data is summarized below.

| TOTAL LOSS IN FILTER CAKE | |
|---|---|
| | % of $P_2O_5$ fed in rock |
| Citrate insoluable (CI) | 0.76 |
| Citrate soluble* (CS) | 4.64 |
| Water soluable (WS) | 2.34 |
| Total loss | 7.74 |
| Total recovery | 92.26 |

*Lattice substitution losses determined using ammonium nitrate instead of ammonium citrate solution.

A typical analysis of the phosphoric acid produced by this process is shown in Table 4. The total residence time, from entering vessel 16 to exiting vessel 48, is calculated at 7.9 hours. The volume of vessel 16 is about 120,000 gallons, the volume of vessel 28 is about 40,000 gallons to normal liquid level.

Phosphate rock is present in the first and in the second slurries in the first and second reaction vessels respectively. The amount present is quite small and will vary considerably. The value for the "Citrate Insoluble" loss of the filter cake is a rough measure of undissolved and unreacted phosphate rock.

EXAMPLES 2 TO 7

The following system as described hereinafter was set up in a pilot plant to duplicate actual plant operation in order to investigate the effect of defoamers and crystal modifiers on the filterability, and hence the crystal size, of the calcium sulfate hemihydrate produced.

Into a first reaction vessel containing reaction slurry was added phosphate rock, recycled phosphoric acid and recycle reaction slurry from the second reaction vessel. Defoamer, when used, was added in the first reaction vessel. The reaction slurry so formed in the first reaction vessel was circulated to the second reaction vessel. Sulfuric acid and crystal modifiers were added to the second reaction slurry. The second reaction vessel was maintained under slight vacuum so as to remove gaseous impurities and water from the slurry. The evaporation of water was utilized to cool the reaction slurry.

The conditions employed in determining the utility of the crystal modifier and the defoamer in early runs and later runs are shown below in Table 5. Results of the tests from the later runs are shown in Table 6.

Phosphate rock is present in the first and in the second slurries in the first and second reaction vessels respectively. The amount present is quite small and will vary considerably. The value for the "Citrate Insoluble" loss of the filter cake is a rough measure of undissolved and unreacted phosphate rock.

EXAMPLE 8

A hemihydrate system substantially as shown in FIGS. I and III and operated substantially as described in Example 1 was discovered to be wasteful of product acid on start-up, that is, the first one or two days of production could not be economically filtered due to fine particles in the feed to the filter and had to be "dumped wet" with a resulting new high loss of $P_2O_5$ values.

In a modified start-up procedure, which is the invention of Gragg et al, the system was first filled with water heated by steam to 210° F. This preheated the vessels while testing the equipment at temperature. The system was drained and filled with 185° F., 31% $P_2O_5$ acid. Phosphate rock was fed to the system, while acid was recycled from the filter feed tank until the solids were builtup to about 30%, the sulfates were adjusted to the proper level (e.g., negative in the dissolver and positive in the crystallizer), and slurry was then sent to the filter. The plant was started up at 150 tons/day feed rate. The filter was lined out within 2 hours of startup (i.e., no wet pans after 2 hrs.). Within 48 hours the design rate of 350 TPD was achieved with no apparent problems. Product acid strength was up to 40% $P_2O_5$ within one shift.

After the completion of a 44 day plant test and several modifications to the dissolver, the plant was again started up. Essentially the same startup procedure was used except the system was not preheated with hot water and 35% acid @ 185° F. was used in the charging of the system. The startup went very smoothly with no particular problems, although the filling of the system was slowed by evaporator problems. The first hemihydrate cake that was produced filtered well. No filter pans were dumped wet during startup.

Upon completion of the plant trial runs in this Example 8, the average parameters in Table 7 were calculated from data gathered over the entire course of the runs.

FIG. I illustrates a reaction system, which can be used either for a hemihydrate or gypsum process, similar to that of FIG. III but showing the incorporation of a splitter box (to provide a head or vacuum seal and also a break to prevent siphoning) and a rock box (to trap hard pebble-like masses which apparently accumulate upon and break off from the sulfuric acid sparger in the crystallizer). Also shown are the condenser between the crystallizer and the vacuum pump (which condenses steam and fluorine compounds), a scrubber to protect the vacuum pump from fluorine compounds and an entrainment separator or disengager (to prevent non-gaseous matter, mostly droplets containing fluorides, from entering the vacuum pump) and the filter (which is the preferred means of separating the calcium sulphate solids from the product phosphoric acid). The splitter box is a compartmented vessel with an entry line which can be moved to the top of either compartment (for slurry from the crystallizer) at the top of one compartment and two exit lines, one at the bottom of each compartment. One exit line is for conducting slurry to the filter feed tank, the other leads to a drain and is used for cleaning the line and the splitter box.

The present process and system can be used in practice of the invention of Ser. No. 676,559, especially in a process for the production of high purity phosphoric acid from phosphate rock containing metal impurities comprising calcium, magnesium, aluminum, ferric and ferrous iron as described therein and in the applications of Ore et al, filed Dec. 29, 1977.

TABLE 1

| Rock Fed TPD | CaO in Rock % | $SO_4$ in Rock % | CaO Fed TPD | Stoichiometric Sulfate ($SO_4$) to CaO in Rock TPD | Sulfate Present in 100% $H_2SO_4$ Fed to Unit, TPD | Sulfate Equivalent Used TPD | Total Sulfate Used TPD | Total $SO_4$ used as a fraction of Stoichiometric Amount |
|---|---|---|---|---|---|---|---|---|
| 1209.5 | 44.90 | 0.65 | 543.07 | 930.97 | 844.4 | 7.86 | 852.26 | 0.915 |
| 1383.1 | 45.97 | 0.65 | 635.81 | 1089.4 | 1052.2 | 8.99 | 1061.2 | 0.974 |
| 1381.6 | 46.76 | 0.65 | 646.04 | 1107.5 | 1024.7 | 8.98 | 1033.7 | 0.933 |
| 1172.2 | 46.81 | 0.65 | 548.71 | 940.64 | 844.3 | 7.62 | 851.9 | 0.906 |
| 1110.9 | 46.89 | 0.65 | 520.90 | 892.97 | 804.6 | 7.22 | 811.82 | 0.909 |

TABLE 2

Phosphate Rock Analysis

| Compound | For Example 1 % By Weight | For Example 8 % By Weight |
|---|---|---|
| $P_2O_5$ | 31.2 | 32.15 |
| CaO | 45.6 | 46.81 |
| $Fe_2O_3$ | 1.4 | 0.79 |
| $Al_2O_3$ | 1.2 | 1.12 |
| MgO | 0.4 | 0.37 |
| $SiO_2$ | 8.7 | 4.6 |
| F | 3.7 | 3.59 |
| $SO_3$ | 0.9 | |
| $CO_2$ | 3.6 | |
| Organic | 1.8 | |
| $H_2O$ | 1.1 | 2.08 |

TABLE 2-continued

Phosphate Rock Analysis

| Compound | For Example 1 % By Weight | For Example 8 % By Weight |
|---|---|---|
| $Na_2O, K_2O$ | 0.4 | |
| $SO_4$ | | 0.79 |

TABLE 3

Typical Phosphate Rock Screen Analysis

| Mesh | Cummulative Percent |
|---|---|
| +14 | 0.4 |
| +24 | 2.6 |
| +28 | 9.3 |
| +35 | 26.6 |
| +48 | 64.1 |
| +65 | 86.4 |
| +100 | 97.7 |
| −100 | 2.3 |

TABLE 4

Phosphoric Acid Analysis

| | Example 1 | Example 8 |
|---|---|---|
| $P_2O_5$ | 37.95 | 41.77 |
| $SO_4$ | 1.72 | 2.41 |
| CaO | 1.04 | 0.23 |
| F | 1.27 | 1.22 |
| MgO | 0.46 | 0.51 |
| $Fe_2O_3$ | 0.97 | 0.97 |
| $Al_2O_3$ | 0.91 | 0.84 |
| Solids | | 0.78 |
| Sp. Gr. | | 1.517 |

TABLE 5

GENERAL REACTION CONDITIONS
(Pilot Plant)

| | Early Runs | Later Runs |
|---|---|---|
| Slurry Density | 1.72 g/cc | 1.72 |
| Sulfate Concentration* | | |
| First Reaction Vessel | −2% | −2 |
| Second Reaction Vessel | +2% | +2 |
| Phosphate Rock Feed Rate | 174 g/min. | 174 |
| Slurry Recycle From Second To First Reaction Vessel | 2200 g/min. | 2200 |
| Recycle Phosphoric Acid Feed Rate To First Reaction Vessel | 390 g/min. | 390 |
| Sulfuric acid (93%) Feed Rate To Second Reaction Vessel | 150 g/min. | 150 |
| Defoamer Feed Rate To First Reaction Vessel | 0.7–1.1 g/min. | 0.25–0.76 |
| Crystal Modifier (CM) Feed Rate To Second Reaction Vessel (1% Soln of CM in Water) | 0.1–0.4 g/min. | 0.006–0.76 |
| Temperature of Slurry In Both Reaction Vessels | 195–205° F. | |
| 50% Mass Dominant Crystal Size | 30–40 | 26–43 |

*By titration method

TABLE 6

| Example | Defoamer Type | Amount Wt. % | Crystal Modifier Type | Crystal Modifier Amount ppm* | Filter Rate** TON $P_2O_5/ft^2$-day | Calcium Sulfate Hemihydrate 50% Mass Dominant Crystal Size (microns) |
|---|---|---|---|---|---|---|
| 1 | None | None | None | None | 0.35 to 0.42 | 42.8 |
| 2 | None | None | None | None | 0.70 | 39.1 |
| 3 | None | None | Actrasol W-40 | 0.1 | 0.85 | 42.8 |
| 4 | AZ10A | 0.071 | Actrasol W-40 | 10.8 | 1.24 | — |
| 5 | AZ10A | 0.12 | Actrasol W-40 | 12.3 | 1.72 | — |
| 6 | AZ10A | 0.058 | None | None | 0.80 | 35 |
| 7 | AZ10A | 0.061 | Actrasol W-40 | 12.2 | 0.70 | 35 |
| 8 | AZ10A | 0.037 | Actrasol W-40 | 10.0 | 0.45 | 26 |

Actrasol W-40 - primarily sodium dodecylsulfonate, Arthur C. Trask Corp., Summit Ill. 60501
AZ10A - Tall oil fatty acids and esters*, AZ Products Co., P.O. Box 67, Eaton Park, Florida 33840
*AZ Defoamer 10-a is a proprietary blend of tall oil fatty acid and a variety of surfactants.
*Based on weight of slurry
**15 in Hg, 1¼"coke thickness, wash to dry solids 1.02, 33% solids in slurry, 40 to 44% $P_2O_5$

TABLE 7

| | Run Average |
|---|---|
| Temperature in Dissolver - °C. | 94–98 |
| Amount $SO_4$ Added Stoichiometric $H_2SO_4$* | 0.96–0.97 |
| % $P_2O_5$ in Product from Crystallizer | 44 |
| Temperature in Crystallizer - °C. | 98–101 |
| Reactor Volume First Stage | |
| Reactor Volume Second Stage | 2.87** |

*Amount $H_2SO_4$ required to convert Ca in Feed to Dissolver to Calcium Sulphate including $SO_4$ in Rock

We claim:

1. A system for the preparation of phosphoric acid from phosphate rock and sulfuric acid, including in combination:

(a) a first reaction vessel containing a first slurry comprising calcium sulfate hemihydrate, monocalcium phosphate and phosphoric acid, (b) a second reaction vessel containing a second slurry comprising calcium sulfate hemihydrate, monocalcium phosphate, sulfuric acid and phosphoric acid, (c) means including a draft tube means in each of said vessels for maintaining a continuous circulation of the slurry therein through said draft tube means at a rate of at least 50% of the volume of the slurry in said vessel per minute, said last mentioned means including a singlewall draft tube disposed centrally in each of said vessels and an agitator means positioned axially in each of said vessels within said draft tube, whereby on actuation of said agitator means the slurry in each of said vessels will flow from the bottom portion of said draft tube up through the draft tube and on exiting the top of the draft tube, the slurry will flow downwardly in the space between said draft tube and the inner wall of the vessel, (d) a first conduit means interconnecting said first and second reaction vessels for conducting said first slurry from said first reaction vessel to said second reaction vessel, (e) a second conduit means interconnecting said vessels for conducting said second slurry from said second reaction vessel to said first reaction vessel, (f) means for providing reduced pressure to said second reaction vessel to effect temperature control in said second reaction vessel by evaporation, means to circulate slurry between said second reaction vessel and said first reaction vessel at a sufficient rate so as to add desired sulfate values and phosphoric acid values to and to effect temperature control in said first reaction vessel, and means to form a vacuum seal between said first and second reaction vessels, (g) an inlet pipe means for introducing a mixture of phosphate rock and phosphoric acid to said first reaction vessel, said inlet pipe means having discharge means to the interior of the draft tube in said first vessel, (h) means for introducing sulfuric acid to said second reaction vessel, (i) means for withdrawing a slurry containing phosphoric acid and calcium sulfate hemihydrate from said second reaction vessel, and, (j) a vent means connected to said inlet pipe means to permit escape of gases and reduce foaming generated by the dissolving reaction in said first vessel.

2. A system as defined in claim 1, including a third reslurry vessel for reslurrying phosphate rock and recycle phosphoric acid, and a third conduit means interconnecting said third vessel with said inlet pipe means to said first reaction vessel.

3. A system as defined in claim 2, said first vessel being a dissolver vessel for essentially dissolving phosphate rock in said first slurry, said second evacuated reaction vessel being cooled by evaporation and functioning as a crystallizer vessel for crystallizing calcium sulfate hemihydrate in said second slurry, and including a fourth filter feed vessel, and a fourth conduit means interconnecting said last mentioned means for withdrawing slurry from said second reaction vessel with said fourth vessel, for conducting said second slurry containing crystallized calcium sulfate hemihydrate and phosphoric acid to said fourth vessel, and an agitator means in said fourth filter feed vessel for maintaining the slurry therein in suspension.

4. A system as defined in claim 3, including a surge tank means in said fourth conduit means.

5. A system as defined in claim 3, including filter means, a fifth conduit means for conducting slurry containing crystalline calcium sulfate hemihydrate and phosphoric acid from said fourth filter feed vessel to said filter means, for filtering crystalline calcium sulfate hemihydrate from said slurry, and a sixth conduit means connecting said filter means with said third reslurry vessel for conducting filtrate containing phosphoric acid to said third vessel.

6. A system as defined in claim 3, including a rock box in said fourth conduit, for trapping any relatively large rocks, stones and objects in said second slurry.

7. A system as defined in claim 3, said first dissolver vessel being positioned at an elevation higher than said fourth filter feed vessel and including an overflow pipe from said first vessel to said fourth vessel for conducting overflow slurry from said first vessel by gravity to said fourth vessel.

8. A system as defined in claim 1, said second reaction vessel being positioned at an elevation higher than said first reaction vessel, said second conduit means being an overflow conduit means permitting return of said second slurry in said second vessel by gravity through said second conduit means to said first slurry in said first vessel.

9. A system as defined in claim 1, including a sparger means in the bottom portion of said second vessel below the draft tube therein, said means for introducing sulfuric acid into said second vessel comprising an inlet means, said inlet means being connected to said sparger means.

10. A system as defined in claim 1, including a first recirculation conduit means for selectively recirculating said first slurry from said first vessel externally thereof and back to said first vessel, a first pump in said first recirculation conduit means, a second recirculation conduit means for selectively recirculating said second slurry from said second vessel externally thereof and back to said second vessel, a second pump in said second recirculation conduit means, and valve means for discontinuing slurry flow in said first conduit means from said first vessel to said second vessel during recirculation of slurry through said first recirculation conduit means or during recirculation of slurry through said second recirculation conduit means.

* * * * *